United States Patent
Bayer et al.

(10) Patent No.: US 12,342,171 B2
(45) Date of Patent: Jun. 24, 2025

(54) IN-VEHICLE CONTROL SYSTEM FOR VEHICLE ACCESSORY INTEGRATION

(71) Applicant: Rivian IP Holdings, LLC, Plymouth, MI (US)

(72) Inventors: Josh Bayer, Costa Mesa, CA (US); Alex Yang, Redwood City, CA (US); Bola Malek, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/143,169

(22) Filed: May 4, 2023

(65) Prior Publication Data

US 2023/0388803 A1    Nov. 30, 2023

Related U.S. Application Data

(63) Continuation of application No. 17/827,306, filed on May 27, 2022, now Pat. No. 11,683,693.

(51) Int. Cl.
*H04W 4/40* (2018.01)
*G06F 8/65* (2018.01)
*H04W 12/50* (2021.01)
*H04W 76/10* (2018.01)

(52) U.S. Cl.
CPC .............. *H04W 12/50* (2021.01); *G06F 8/65* (2013.01); *H04W 4/40* (2018.02); *H04W 76/10* (2018.02)

(58) Field of Classification Search
CPC ....... H04W 12/50; H04W 4/40; H04W 76/10; G06F 8/65

USPC ......................................................... 455/41.2
See application file for complete search history.

(56) References Cited

U.S. PATENT DOCUMENTS

| | | | |
|---|---|---|---|
| 8,239,087 B2* | 8/2012 | Dybalski | B60K 35/10 701/29.1 |
| 9,738,125 B1* | 8/2017 | Brickley | H04W 4/70 |
| 10,286,853 B1* | 5/2019 | Carbone | B60P 1/003 |
| 11,824,413 B2* | 11/2023 | Rahman | H02K 3/16 |
| 2002/0140289 A1* | 10/2002 | McConnell | B60R 11/02 307/10.1 |
| 2005/0203684 A1* | 9/2005 | Borgesson | B60K 37/00 701/1 |

(Continued)

OTHER PUBLICATIONS

Final Office Action mailed Nov. 23, 2022, for U.S. Appl. No. 17/827,306, filed May 27, 2022, eighteen pages.
(Continued)

*Primary Examiner* — April G Gonzales
(74) *Attorney, Agent, or Firm* — BAKERHOSTETLER

(57) ABSTRACT

A control system for a vehicle may include one or more processors configured to execute instructions to receive, by one or more modules of the vehicle control system, a request to pair an accessory with the vehicle and determine, by the one or more modules of the vehicle control system, whether the accessory is preconfigured for pairing with the vehicle. In response to determining that the accessory is preconfigured for pairing with the vehicle, the one or more processors are configured to execute instructions to pair, by the one or more modules of the vehicle control system, the accessory with the vehicle and cause, by the one or more modules of the vehicle control system, a display of the vehicle to display a user interface customized for the accessory as paired with the vehicle.

20 Claims, 6 Drawing Sheets

(56) References Cited

U.S. PATENT DOCUMENTS

| | | | | |
|---|---|---|---|---|
| 2009/0191922 | A1* | 7/2009 | Rokusek | H04M 1/6075 |
| | | | | 455/41.2 |
| 2014/0073254 | A1* | 3/2014 | Ichihara | H04W 76/14 |
| | | | | 455/41.2 |
| 2017/0262820 | A1* | 9/2017 | Al Salah | G07C 5/02 |
| 2018/0018664 | A1* | 1/2018 | Purves | G06Q 20/40145 |
| 2018/0039917 | A1* | 2/2018 | Buttolo | G06Q 10/109 |
| 2018/0114388 | A1* | 4/2018 | Nagler | B60R 25/2054 |
| 2018/0121903 | A1* | 5/2018 | Al Salah | G06Q 20/24 |
| 2018/0361930 | A1* | 12/2018 | Levi | B60R 1/30 |
| 2019/0044629 | A1* | 2/2019 | Stinnett | H04B 17/318 |
| 2019/0180630 | A1* | 6/2019 | Kleinbeck | G01S 3/46 |
| 2020/0064444 | A1* | 2/2020 | Regani | G01S 7/006 |
| 2020/0106585 | A1* | 4/2020 | Bayer | H04W 76/10 |
| 2020/0148280 | A1* | 5/2020 | Elder | B60R 9/02 |
| 2020/0148281 | A1* | 5/2020 | Elder | B60R 9/12 |
| 2020/0151943 | A1* | 5/2020 | Navarrette | G02B 27/01 |
| 2020/0198578 | A1* | 6/2020 | Schroll | G07C 9/00309 |
| 2020/0198587 | A1* | 6/2020 | Du | B60S 1/485 |
| 2020/0247325 | A1* | 8/2020 | Jung | B60R 9/058 |
| 2020/0298766 | A1* | 9/2020 | Jung | B60R 9/04 |
| 2020/0380896 | A1* | 12/2020 | Alex | G09F 21/042 |
| 2020/0406860 | A1* | 12/2020 | Mai | B60R 25/31 |
| 2021/0219114 | A1* | 7/2021 | Otaka | H04W 4/48 |
| 2021/0346805 | A1* | 11/2021 | Daniali | A63F 13/332 |
| 2021/0362658 | A1* | 11/2021 | Carbone | B60R 9/042 |
| 2021/0392107 | A1* | 12/2021 | Kakumanu | H04L 51/046 |
| 2021/0392234 | A1* | 12/2021 | Lowman | H04L 65/65 |
| 2021/0392551 | A1* | 12/2021 | Rubenstein | H04W 8/183 |
| 2022/0017018 | A1* | 1/2022 | Perkins | E04H 15/06 |
| 2022/0029964 | A1* | 1/2022 | Kakumanu | H04L 41/0806 |
| 2022/0080897 | A1* | 3/2022 | Carbone | B60P 1/30 |
| 2022/0242366 | A1* | 8/2022 | Nagata | B60R 25/23 |
| 2022/0244769 | A1* | 8/2022 | Pan | G06F 1/266 |

OTHER PUBLICATIONS

Non-Final Office Action mailed Aug. 18, 2022, for U.S. Appl. No. 17/827,306, filed May 27, 2022, fifteen pages.

Notice of Allowance mailed Feb. 7, 2023, for U.S. Appl. No. 17/827,306, filed May 27, 2022, eight pages.

* cited by examiner

IN-VEHICLE CONTROL SYSTEM FOR VEHICLE ACCESSORY INTEGRATION

CROSS-REFERENCE TO RELATED APPLICATIONS

This application is a continuation of U.S. patent application Ser. No. 17/827,306, filed May 27, 2022, the content of which is incorporated herein by reference in its entirety.

INTRODUCTION

In-vehicle user experience and control systems (e.g., in-vehicle infotainment (IVI) systems) may generally include systems that may provide entertainment and information monitoring and control to the driver or other passengers of the vehicle by way of one or more computing devices and associated displays included in the vehicle. However, such in-vehicle user experience and control systems may be limited to information monitoring and control of only built-in components of the vehicle. In addition, such systems may not adequately provide security mechanisms to prevent unauthorized hardware and/or software from interacting with the vehicle.

BRIEF SUMMARY

Embodiments of the present disclosure are directed toward an in-vehicle control system including a vehicle accessory integration framework for pairing and integrating a vehicle accessory with a vehicle. The vehicle accessory may be designed for use in conjunction with the vehicle and configured to be controlled using a user interface provided by the vehicle. Specifically, the in-vehicle control system (e.g., in-vehicle infotainment (IVI) system) may include a vehicle accessory integration framework, which may include a predetermined software requirements specification (SRS) for pairing and fully integrating a vehicle accessory with the in-vehicle control system and the vehicle, for example, such that the vehicle accessory may be seamlessly identified, authenticated and authorized, integrated, displayed, and controlled by the in-vehicle control system of the vehicle. For example, one or more computing modules of the in-vehicle control system may receive a request or otherwise detect that a driver or owner of the vehicle is attempting to couple a vehicle accessory to the vehicle.

The one or more computing modules may then determine whether the vehicle accessory is preconfigured for pairing with the vehicle. For example, the one or more computing modules may determine whether the vehicle accessory is preconfigured in accordance with one or more predetermined application programming interfaces (APIs), networking and messaging protocols, provisioning protocols, and so forth described in a software development kit (SDK) or SRS published by the designer and manufacturer of the vehicle and/or the in-vehicle control system as part of a plug and play (PnP) (e.g., "Works With "X"") suite or ecosystem of vehicle accessories that may be specifically designed to be coupled to the vehicle. The in-vehicle control system may then allow the vehicle accessory to be paired and fully integrated with the vehicle, such that the driver or owner of the vehicle may view, monitor, and control the settings and functionality of the vehicle accessory by way of the in-vehicle control system (e.g., IVI system).

In certain embodiments, a vehicle control system may receive, by one or more modules of the vehicle control system, a request to pair a vehicle accessory with the vehicle. In certain embodiments, as a security measure and to assess compatibility and/or interoperability, the vehicle control system may then determine, by the one or more modules of the vehicle control system, whether the vehicle accessory is preconfigured for pairing with the vehicle. For example, in one embodiment, the vehicle may be a product of a first manufacturer and the vehicle accessory may a product of the first manufacturer. In some embodiments, the vehicle control system may determine whether the vehicle accessory is preconfigured for pairing with the vehicle by determining whether the vehicle accessory is a product of the first manufacturer.

In other embodiments, the vehicle control system may determine whether the vehicle accessory is preconfigured for pairing with the vehicle by determining whether the vehicle accessory is preconfigured for a plug and play (PnP) pairing with the vehicle. In certain embodiments, in response to determining that the vehicle accessory is preconfigured for pairing with the vehicle, the vehicle control system may then pair, by the one or more modules of the vehicle control system, the vehicle accessory with the vehicle. The vehicle control system may then cause, by the one or more modules of the vehicle control system, a display of the vehicle to display a user interface customized for the vehicle accessory as paired with the vehicle.

In other embodiments, in response to determining that the vehicle accessory is not preconfigured for pairing with the vehicle, the vehicle control system may then provide, by the one or more modules of the vehicle control system, a request for identification and configuration information associated with the vehicle accessory. For example, in one embodiment, the identification and configuration information may include one or more of authorization information, authentication information, a unique identifier (UID), a device type for the vehicle accessory, a provisioning protocol for the vehicle accessory, an approval certification for the vehicle accessory, one or more networking protocols, or one or more application programming interfaces (APIs). In one embodiment, determining that the vehicle accessory is not preconfigured for pairing with the vehicle may include determining that the vehicle is a product of a first manufacturer and the vehicle accessory is a product of a second manufacturer, which is different from the second manufacturer.

In certain embodiments, based on the requested identification and configuration information associated with the vehicle accessory, the vehicle control system may then pair, by the one or more modules of the vehicle control system, the vehicle accessory with the vehicle in response to receiving the identification and configuration information. The vehicle control system may then cause, by the one or more modules of the vehicle control system, a display of the vehicle to display a user interface customized for the vehicle accessory as paired with the vehicle based on the received identification and configuration information. In certain embodiments, the vehicle accessory may have been developed by the second manufacturer utilizing a software development kit (SDK) or a software requirements specification (SRS) associated with the vehicle.

In certain embodiments, subsequent to causing the display of the vehicle to display the user interface customized for the vehicle accessory, the vehicle control system may then receive, via the user interface displayed on the display, one or more user inputs corresponding to a request for the vehicle accessory to perform an operation, and cause by the one or more modules of the vehicle control system, the vehicle accessory to perform the operation. In certain embodiments, subsequent to causing the display of the vehicle to display the user interface customized for the vehicle accessory, the vehicle control system may further receive, via the user interface displayed on the display, one or more user inputs corresponding to a request to view one or more settings options associated with the vehicle accessory, and cause, by the one or more modules of the vehicle control system, the display of the vehicle to display the one or more settings options associated with the vehicle accessory.

In certain embodiments, after the vehicle accessory has paired with the vehicle, the vehicle may enable coordinated control over related native vehicle components in conjunction with controlling the vehicle accessory. In certain embodiments, the vehicle may enable selection of the specific related native vehicle components with which coordinated control is to be provided. In certain embodiments, the related native vehicle components may provide similar functionality as the vehicle accessory or functionality that is complementary to the vehicle accessory.

In certain embodiments, the vehicle accessory may be configured to detachably couple to an external portion of the vehicle and further configured to communicatively couple to the vehicle control system. For example, in some embodiments, the vehicle accessory may include one or more of a camping accessory, a roof rack accessory, a front rack accessory, a crossbar accessory, a lighting accessory, a sporting equipment mount accessory, a sporting gear shuttle accessory, a towing accessory, a towing capacity gauge accessory, a ladder rack accessory, a lumber rack accessory, a truck bed cover accessory, a truck tool box accessory, a trailer hitch accessory, a horse trailer accessory, a rock guard accessory, a snow plow accessory, a bale mover accessory, a bale loader accessory, or a cargo carrier accessory.

In certain embodiments, the vehicle control system may receive, by one or more modules of the vehicle control system, a request to pair a second vehicle accessory with the vehicle. In certain embodiments, the vehicle control system may then determine by the one or more modules of the vehicle control system, whether the second vehicle accessory is preconfigured for pairing with the vehicle. In certain embodiments, in response to determining that the second vehicle accessory is preconfigured for pairing with the vehicle, the vehicle control system may pair, by the one or more modules of the vehicle control system, the second vehicle accessory with the vehicle. The vehicle control system may then cause, by the one or more modules of the vehicle control system, the display of the vehicle to display a second user interface customized for the second vehicle accessory as paired with the vehicle.

The embodiments disclosed above are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present disclosure are directed toward an in-vehicle control system including a vehicle accessory integration framework for pairing and integrating a vehicle accessory with a vehicle. The vehicle accessory may be designed for use in conjunction with the vehicle and configured to be controlled using a user interface provided by the vehicle. Specifically, the in-vehicle control system (e.g., in-vehicle infotainment (IVI) system) may include a vehicle accessory integration framework, which may include a predetermined software requirements specification (SRS) for pairing and fully integrating a vehicle accessory with the in-vehicle control system and the vehicle, for example, such that the vehicle accessory may be seamlessly identified, authenticated and authorized, integrated, displayed, and controlled by the in-vehicle control system of the vehicle. For example, one or more computing modules of the in-vehicle control system may receive a request or otherwise detect that a driver or owner of the vehicle is attempting to couple a vehicle accessory to the vehicle.

The one or more computing modules may then determine whether the vehicle accessory is preconfigured for pairing with the vehicle. For example, the one or more computing modules may determine whether the vehicle accessory is preconfigured in accordance with one or more predetermined application programming interfaces (APIs), networking and messaging protocols, provisioning protocols, and so forth described in a software development kit (SDK) or SRS published by the designer and manufacturer of the vehicle and/or the in-vehicle control system as part of a plug and play (PnP) (e.g., "Works With "X"") suite or ecosystem of vehicle accessories that may be specifically designed to be coupled to the vehicle. Making such a determination before allowing the vehicle accessory to pair with the vehicle may serve as a security measure, in order to ensure that malicious hardware and/or software is not permitted to connect with the vehicle's control system and/or notifying the user that the vehicle accessory is not authorized to connect with the vehicle. Such a determination may also serve to assess compatibility and/or interoperability of hardware and/or software of the vehicle accessory with the vehicle control system. The in-vehicle control system may then allow the vehicle accessory to be paired and fully integrated with the vehicle, such that the driver or owner of the vehicle may view, monitor, and control the settings and functionality of the vehicle accessory by way of the in-vehicle control system (e.g., IVI system).

Figure 1:
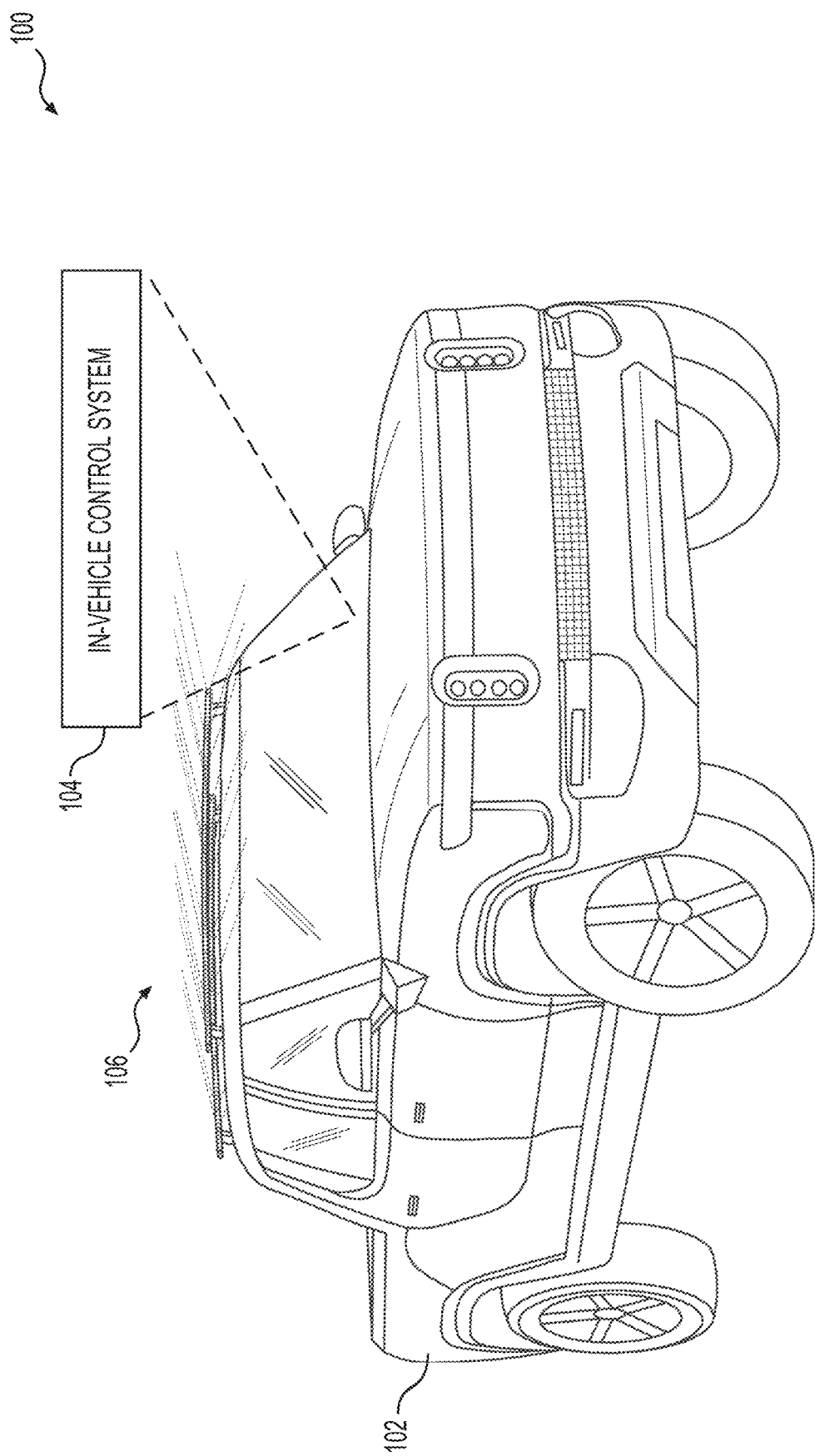
FIG. 1 illustrates an example embodiment of a vehicle environment including a vehicle 102, an in-vehicle control system, and one or more vehicle accessories.

FIG. 1 illustrates an example embodiment of a vehicle environment 100 including a vehicle 102, an in-vehicle control system 104, and one or more vehicle accessories 106 to be coupled to an external portion of the vehicle 102, in accordance with the presently disclosed embodiments. As depicted, the vehicle 102 may include any passenger vehicle (e.g., a car, a truck, a pickup truck, a sports utility vehicle (SUV), a minivan, a crossover utility vehicle (CUV), a cargo van, a towing truck) that may utilized for transportation and to navigate one or more rural environments, urban environments, and/or off-roading and mountainous environments. In one embodiment, the vehicle 102 may include a gasoline-powered vehicle that may be propelled, for example, by an internal combustion engine (ICE) or other fuel-injection engine.

In certain embodiments, the vehicle 102 may include, for example, an electric vehicle (EV), a battery electric vehicle (BEV), a hybrid electric vehicle (HEV), a plug-in hybrid electric vehicle (PHEV), or other vehicle 102 that may be in part or wholly propelled by one or more electric motors (e.g., synchronous electric motors, permanent magnet synchronous electric motors (PMSMs), induction motors (IMs), line start synchronous motors (LSSMs), line start permanent magnet motors (LSPMMs), synchronous reluctance motors (SynRMs)) utilizing power stored to one or more batteries included in the vehicle 102.

In some embodiments, the vehicle 102 may include an autonomous or semi-autonomous vehicle suitable for operating, for example, in accordance with Level-3 autonomous driving, Level-4 autonomous driving, Level-5 autonomous driving, or switching between the different levels of autonomous driving functionality. Further, while the present embodiments may be discussed primarily with respect to the example embodiment of a personal passenger vehicle 102, it should be appreciated that, in other embodiments, the vehicle 102 may be one of a fleet of similar vehicles 102 (e.g., a fleet of cargo vans, a fleet of police vehicles, a fleet of taxis, or a fleet of food-service vehicles).

In certain embodiments, as further depicted by FIG. 1, the vehicle 102 may include an in-vehicle control system 104. In certain embodiments, the in-vehicle control system 104 may include an in-vehicle infotainment (IVI) system or other in-vehicle control system that may be suitable for providing entertainment and information monitoring and control features to a driver or one or more passengers of the vehicle 102. For example, in some embodiments, the in-vehicle control system 104 may include some combination of software, hardware, and middleware that may be suitable for allowing the driver or one or more passengers of the vehicle 102, for example, to stream media content (e.g., audio data, video data, image data, call log data, navigational maps, vehicle data, driver(s) profile data, weather data), enable the use of voice-based and touch-based control of various components and applications (e.g., vehicle 102 driving mode; camera angle and adjustments; mirror angle and adjustments; seating adjustments; vehicle 102 external and internal lighting adjustments; powering the vehicle 102 "ON" or "OFF", locking and unlocking the vehicle 102; windowing opening and closing; trunk, hatch, or tailgate opening and closing; requesting updates from the vehicle 102; pairing with one or more personal electronic devices of the driver or other passengers of the vehicle 102; creating and modifying one or more driver profiles; controlling and managing the settings and functionality of one or more components of the vehicle 102) on the vehicle 102, and for allowing the vehicle to send and receive over-the-air (OTA) information between the vehicle 102 and one or more external devices (e.g., between vehicle 102 and one or more remote servers, between the vehicle 102 and one or more other vehicles, between the vehicle 102 and the one or more vehicle accessories 106).

In certain embodiments, a driver or owner of the vehicle 102 may desire to couple one or more vehicle accessories 106 to the vehicle 102. For example, in some embodiments, the one or more vehicle accessories 106 may include a vehicle accessory (e.g., an auxiliary component or part separate and distinct from the vehicle 102 itself and suitable to perform functions or operations in addition to the nominal driving operations of the vehicle 102) that may configured to be disposed onto an external portion (e.g., roof of the vehicle 102, front side of the vehicle 102, backside of the vehicle 102, along one or more side panels of the vehicle 102, along an underneath portion of the vehicle 102) of the vehicle 102. In one embodiment, the one or more vehicle accessories 106 may be part of a suite or ecosystem of vehicle accessories that may be designed and manufactured by the same designer and manufacturer of the vehicle 102. In another embodiment, the one or more vehicle accessories 106 may include one or more vehicle accessories that may be designed and manufactured by a third-party original equipment manufacturer (OEM) to be utilized with the vehicle 102.

For example, in some embodiments, the one or more vehicle accessories 106 may include one or more camping or outdoor accessories (e.g., a tent, a propane tank, sporting equipment), a roof rack accessory (e.g. a ski rack, a bicycle rack, a surfing board rack), a front rack accessory (e.g., a bicycle mount, a detachable front grill, a dirt bike mount), a crossbar accessory, a lighting accessory (e.g., a light bar, a fog lighting rack, one or more light-emitting diode (LED) light bars, one or more laser light bars, one or more infrared light bars), a sporting gear shuttle accessory (e.g., a detectable shuttle or compartment for sporting clothing and gear, such as helmets, ski clothing and gear, hiking clothing and gear, biking clothing and gear), or other vehicle accessory 106 that may be utilized by the driver or owner of the vehicle 102 in one or more off-roading or outdoors activities.

In other embodiments, the one or more vehicle accessories 106 may include a towing accessory (e.g., pickup truck hitch, a lift-and-tow connector), a towing capacity gauge accessory, a ladder rack accessory (e.g., for mounting one or more ladders to the roof of the vehicle 102), a lumber rack accessory (e.g., for carrying lumber on the roof of the vehicle 102), a truck bed cover accessory (e.g., a tonneau cover), a truck tool box accessory, a trailer hitch accessory, a horse trailer accessory, a rock guard accessory, a snow plow accessory, a bale mover accessory, a bale loader accessory, a cargo carrier accessory, or other vehicle accessory 106 that may be utilized by the driver or owner of the vehicle 102 in one or more commercial, industrial, or farming applications. In addition to the one or more vehicle accessories 106 being physically and detachably coupled to the vehicle 102, in accordance with the presently disclosed embodiments, the in-vehicle control system 104 may be suitable for also electrically and communicatively coupling the one or more vehicle accessories 106 to the vehicle 102, such that the driver or owner of the vehicle 102 may monitor and control the one or more vehicle accessories 106 by way of the in-vehicle control system 104.

Figure 2:
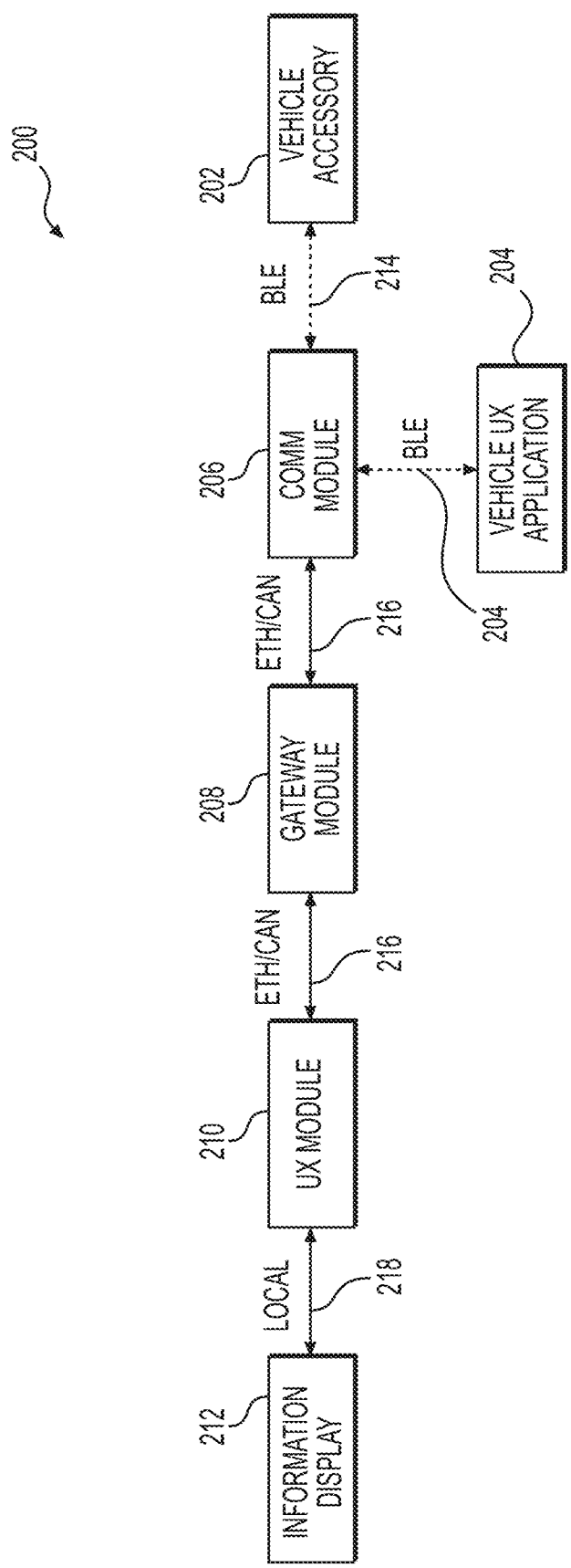
FIG. 2 illustrates an example embodiment of an in-vehicle control system including a vehicle accessory integration framework for pairing and integrating one or more vehicle accessories with a vehicle.

FIG. 2 illustrates an example embodiment of an in-vehicle control system 200 including a vehicle accessory integration framework for pairing and integrating one or more vehicle accessories with a vehicle, in accordance with the presently disclosed embodiments. As depicted, in certain embodiments, the in-vehicle control system 200 may include a vehicle accessory 202, a vehicle user experience ("UX") application 204, a telecommunications module 206, a gateway module 208, a user experience ("UX") module 210, and an information monitoring and control display 212. As generally noted above with respect to FIG. 1, in some embodiments, the vehicle accessory 202 may be part of a suite or ecosystem of vehicle accessories that may be designed and manufactured, for example, by the same designer and manufacturer of the vehicle 102 and/or the in-vehicle control system 200.

In other embodiments, the vehicle accessory 202 may include one or more vehicle accessories that may be designed and manufactured by a third-party OEM to be utilized with the vehicle 102. For example, in accordance with the presently disclosed embodiments, one or more third-party developers may be allowed to develop third-party applications utilizing an API included as part of a software design kit (SDK) or other software requirements specification (SRS) (e.g., a defined and formalized set of software specifications that one or more vehicle accessories 202 may be adherent to for performing a "handshake" with the in-vehicle control system 200 and/or the vehicle 102) developed and published, for example, by the designer and manufacturer of the vehicle 102 and/or the in-vehicle control system 200. In some embodiments, the third-party developers may also be allowed to produce mobile applications (e.g., "apps") that may run on a mobile electronic device of the driver or owner of the vehicle 102 in connection with the in-vehicle control system 200 to further facilitate pairing and integrating the vehicle accessory 202 with the vehicle 102.

For example, in certain embodiments, the vehicle accessory 202 may include one or more electronic-based functionalities (e.g., "smart" vehicle accessory) that may allow the vehicle accessory 202 to identify itself to the in-vehicle control system 200 or to be identified by the in-vehicle control system 200 prior to being paired and integrated with the in-vehicle control system 200 and the vehicle 102. For example, in some embodiments, the vehicle accessory 202 may include a vehicle accessory of a suite or ecosystem of vehicle accessories that may be preconfigured (e.g., "Works With 'X'") to be paired and integrated with the in-vehicle control system 200 and vehicle 102. In certain embodiments, as further depicted by FIG. 2, the vehicle accessory 202 may be coupled to the vehicle UX application 204 utilizing one or more short-range wireless communication networks 214 (e.g., Bluetooth®, Bluetooth® Low Energy (BLE), IPv6 over Low-Power Wireless Personal Area Networks (6LoW-PAN), near-field communication (NFC), or other short-range vehicle area network (VAN)). For example, the one or more short-range wireless communication networks 214 may be an initial wireless connection established between the in-vehicle control system 200 and the vehicle accessory 202 by way of the telecommunications module 206.

For example, in some embodiments, the telecommunications module 206 may include a telematics control unit (TCU) that may be utilized, for example, to control wireless tracking, diagnostics, and communication between the vehicle 102 and the vehicle accessory 202 and/or between the vehicle 102 and one or more other components of the vehicle 102 or a remote server associated with the vehicle 102. In certain embodiments, upon the telecommunications module 206 establishing an initial wireless connection between the in-vehicle control system 200 and the vehicle accessory 202, one or more signals corresponding to a request for the vehicle accessory 202 to be paired and integrated with the vehicle 102 may be passed from the telecommunications module 206 to the gateway module 208 via a an Ethernet connection (e.g., Automotive Ethernet), a car area network (CAN), or other high-speed data network 216 that may be included as part of the in-vehicle control system 200.

In certain embodiments, the gateway module 208 may include any controller or processor-based device that may be suitable for interconnecting and securely transferring data across the various network connections 214, 216, 218 included as part of the in-vehicle control system 200. In certain embodiments, based on the one or more signals received from the telecommunications module 206, the gateway module 208 may determine whether the vehicle accessory 202 is preconfigured for pairing and integrating with the in-vehicle control system 200 and the vehicle 102. For example, in some embodiments, the gateway module 208 may determine whether the vehicle accessory 202 is an accessory designed and manufactured by the same designer and manufacturer of the vehicle 102 and/or designed and manufactured in accordance with a SDK or other SRS (e.g., a defined and formalized set of software specifications that one or more vehicle accessories 202 are to be adherent to for performing a "handshake" with the in-vehicle control system 200 and/or the vehicle 102) developed and published, for example, by the designer and manufacturer of the vehicle 102 and/or the in-vehicle control system 200. For example, in certain embodiments, the gateway module 208 may determine whether the vehicle accessory 202 is preconfigured in accordance with one or more predetermined APIs, networking and messaging protocols, provisioning protocols, and so forth described within the SDK or SRS as part of a plug and play (PnP) (e.g., "Works With "X"") suite or ecosystem of vehicle accessories 202 that may be specifically designed to be coupled to the vehicle 102. The vehicle accessory 202 may be preconfigured to interface with, to be controlled by, or to exchange information with one or more particular ECUs of the vehicle control system; the particular ECUs may comprise additional software specifically designed to interface with, control, or exchange information with the vehicle accessory.

In certain embodiments, in response to determining that the vehicle accessory 202 is preconfigured for pairing and integrating with the in-vehicle control system 200 and the vehicle 102, the gateway module 208 may instruct the telecommunications module 206 to pair and fully integrate the vehicle accessory 202 with the in-vehicle control system 200 and the vehicle 102. Upon pairing and fully integrating the vehicle accessory 202 with the in-vehicle control system 200 and the vehicle 102, one or more signals may be passed between the vehicle accessory 202, the telecommunications module 206, and the gateway module 208 and UX module 210 to cause the information monitoring and control display 212 (e.g., touch-sensitive display) to display a user interface customized for the vehicle accessory 202.

For example, in some embodiments, the in-vehicle control system 200 may display to the driver or owner of the vehicle 102, for example, a user interface customized to the type and functionality of the vehicle accessory 202. In this way, the driver or owner of the vehicle 102 may be allowed to view, update, or adjust one or more settings associated with the vehicle accessory 202, control a functionality of the vehicle accessory 202, or to verify the physical, electrical, or communicative installation of the vehicle accessory 202 all by way of the information monitoring and control display 212.

In certain embodiments, in accordance with the presently disclosed techniques, a driver or owner of the vehicle 102 may attempt to couple a vehicle accessory 202 that is not preconfigured for pairing and integrating with the in-vehicle control system 200 and the vehicle 102. For example, in certain embodiments, in response to the gateway module 208 determining that the vehicle accessory 202 is not preconfigured for pairing and fully integrating with the in-vehicle control system 200 and the vehicle 102, one or more signals may be passed between the gateway module 208 and the telecommunications module 206 and the vehicle accessory 202 to request from the vehicle accessory 202 for identification and configuration information associated with the vehicle accessory 202.

For example, in certain embodiments, upon determining that the vehicle accessory 202 is not preconfigured for pairing and fully integrating with the in-vehicle control system 200 and the vehicle 102, the gateway module 208 may provide a request via the telecommunications module 206 to the vehicle accessory 202 for identification and configuration information including, for example, one or more of authorization information, authentication information, unique identifier (UID), a device type for the vehicle accessory 202, a provisioning protocol for the vehicle accessory 202, an approval certification for the vehicle accessory 202, one or more networking or messaging protocols, one or more APIs, or other criteria that may be included within a SDK or SRS (e.g., a defined and formalized set of software specifications that one or more vehicle accessories 202 are to be adherent to for performing a "handshake" with the in-vehicle control system 200 and/or the vehicle 102). In certain embodiments, upon receiving the identification and configuration information, the gateway module 208 may then determine whether the vehicle accessory 202 is suitable for pairing and fully integrating with the in-vehicle control system 200 and the vehicle 102.

For example, in certain embodiments, as part of a suitability criteria (e.g., identification, authentication, and authorization process), the gateway module 208 may include one or more arbitration systems (e.g., one or more multiplexers (MUXs), one or more software-based arbiters) that may be utilized to arbitrate between vehicle accessories 202 determined suitable for pairing and fully integrating with the in-vehicle control system 200 and the vehicle 102 based on the identification and configuration information and vehicle accessories 202 determined unsuitable for pairing and fully integrating with the in-vehicle control system 200 and the vehicle 102 (e.g., particularly when the gateway module 208 has previously determined that one or more particular vehicle accessories 200 are not preconfigured for pairing and fully integrating with the in-vehicle control system 200 and the vehicle 102).

For example, in certain embodiments, when the gateway module 208 has previously determined that one or more particular vehicle accessories 202 are not preconfigured for pairing and fully integrating with the in-vehicle control system 200 and the vehicle 102, the gateway module 208 may establish, for example, a hierarchy of trust, a web of trust, or other trust model with respect to the one or more particular vehicle accessories 202 for approving and certifying the one or more particular vehicle accessories 202 to be paired and integrated with the in-vehicle control system 200 and the vehicle 102, for example, in a limited-access configuration. This may allow, for example, the driver or owner of the vehicle 102 and/or the designer and manufacturer of the vehicle 102 and/or the in-vehicle control system 200 to control, limit, or restrict the access to certain information associated with the vehicle 102 or the driver or owner of the vehicle 102 with respect particular vehicle accessories 202 not preconfigured for pairing and fully integrating with the in-vehicle control system 200 and the vehicle 102.

In certain embodiments, upon determining that the requested identification and configuration information satisfy the suitability criteria, the gateway module 208 may instruct the telecommunications module 206 to pair and integrate the vehicle accessory 202 with the in-vehicle control system 200 and the vehicle 102 in accordance with a limited-access or restricted-access configuration. In one embodiment, upon pairing and integrating the vehicle accessory 202 with the in-vehicle control system 200 and the vehicle 102, one or more signals may be passed between the vehicle accessory 202, the telecommunications module 206, and the gateway module 208 and UX module 210 to cause the information monitoring and control display 212 (e.g., touch-sensitive display) to display a user interface customized for the vehicle accessory 202. In certain embodiments, upon determining that the requested identification and configuration information do not satisfy the suitability criteria, the gateway module 208 may instruct the telecommunications module 206 to reject pairing and integrating the vehicle accessory 202 with the in-vehicle control system 200 and the vehicle 102.

In certain embodiments, after the vehicle accessory has paired with the vehicle, the vehicle control system may enable coordinated control over related native vehicle components in conjunction with controlling the vehicle accessory. For example, after a lighting accessory has been paired with the vehicle, the vehicle control system may enable coordinated control of a level of brightness of other lights on the vehicle in conjunction with controlling the level of brightness of the lighting accessory. In another example, after a winch accessory has paired with the vehicle, the vehicle control system may enable coordinated control of a drive mode of the vehicle, a suspension of the vehicle, and a power consumption mode of the vehicle in conjunction with controlling the winch accessory. In certain embodiments, the vehicle may enable selection of the specific related native vehicle components with which coordinated control is to be provided. In certain embodiments, the related native vehicle components may provide similar functionality as the vehicle accessory or functionality that is complementary to the vehicle accessory.

Figure 3:
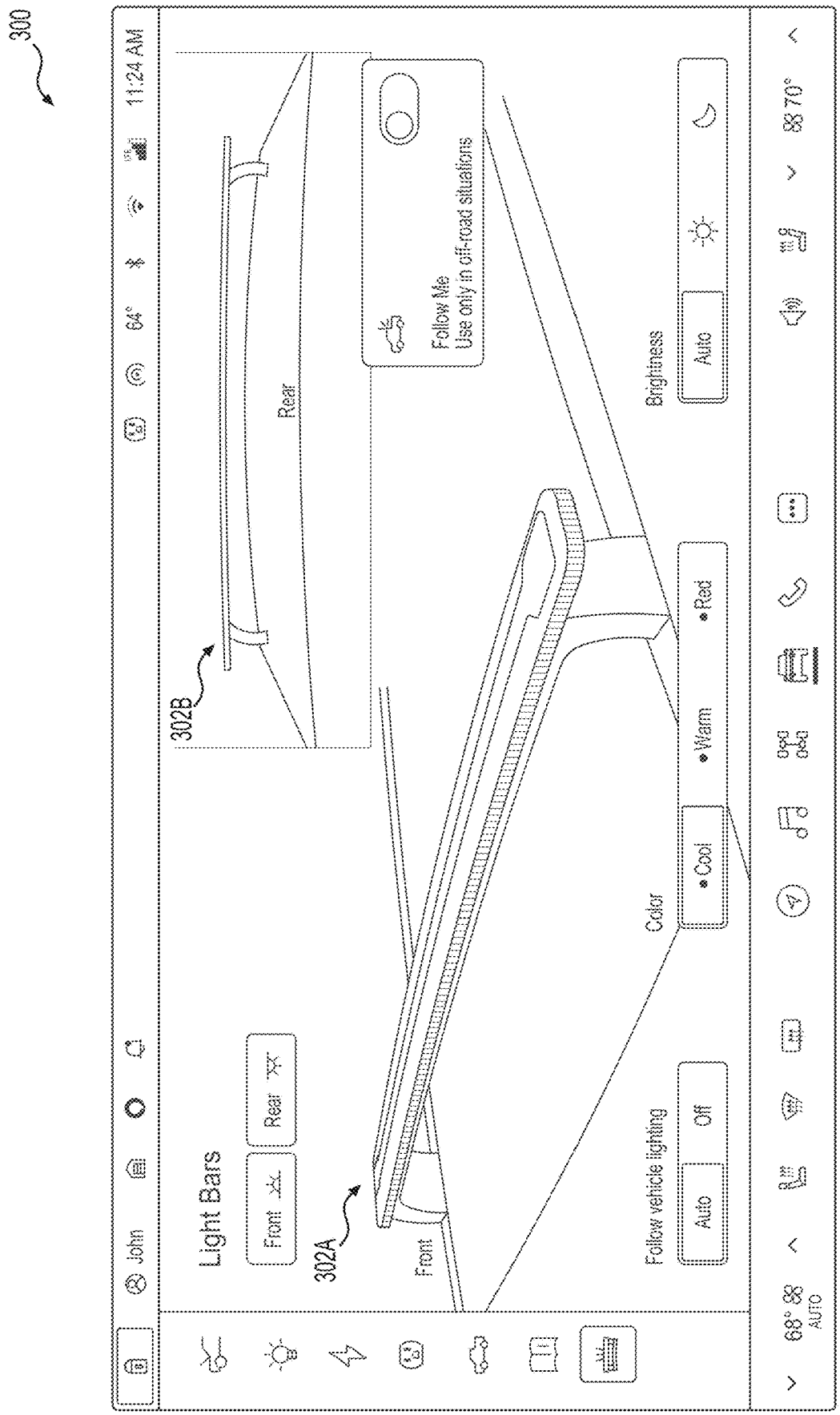
FIG. 3 illustrates an example user interface customized for a vehicle accessory paired and integrated with a vehicle.

FIG. 3 illustrates an example user interface 300 customized for a vehicle accessory paired and integrated with a vehicle, in accordance with the presently disclosed embodiments. For example, in one embodiment, the user interface 300 may include, for example, a user interface that may be generated and displayed on the information monitoring and control display 212 of the vehicle 102. In certain embodiments, the user interface 300 may be customized for one or more light bars 302A, 302B embodiments of the vehicle accessory 202 described above with respect to FIG. 2. For example, in one embodiment, the one or more light bars 302A, 302B may include one or more light bars 302A, 302B that may be disposed onto a roof or other external portion of the vehicle 102. In certain embodiments, as further depicted by FIG. 3, the user interface 300 may display information regarding the physical coupling of the one or more light bars 302A, 302B to the vehicle 102. As further depicted, the user interface 300 may include one or more control options or settings options (e.g., "Follow Vehicle Lighting", "Use Only in Off-Road Situations") that the driver or owner of the vehicle 102 may select to adjust or control the functionality of the one or more light bars 302A, 302B.

For example, in certain embodiments, the user interface 300 may include control options or settings options for adjusting a power consumption of the one or more light bars 302A, 302B, a brightness or a dimness of the one or more light bars 302A, 302B, a time or a location for which the one or more light bars 302A, 302B is to be powered "ON" or "OFF", a vehicle 102 speed for which the one or more light bars 302A, 302B is to be powered "ON" or "OFF", one or more weather conditions for which the one or more light bars 302A, 302B is to be powered "ON" or "OFF", a steering angle of the vehicle 102 for which the one or more light bars 302A, 302B is to be powered "ON" or "OFF", one or more lighting conditions for which the one or more light bars 302A, 302B is to be powered "ON" or "OFF" or brightened or dimmed, and so forth.

Figure 4:
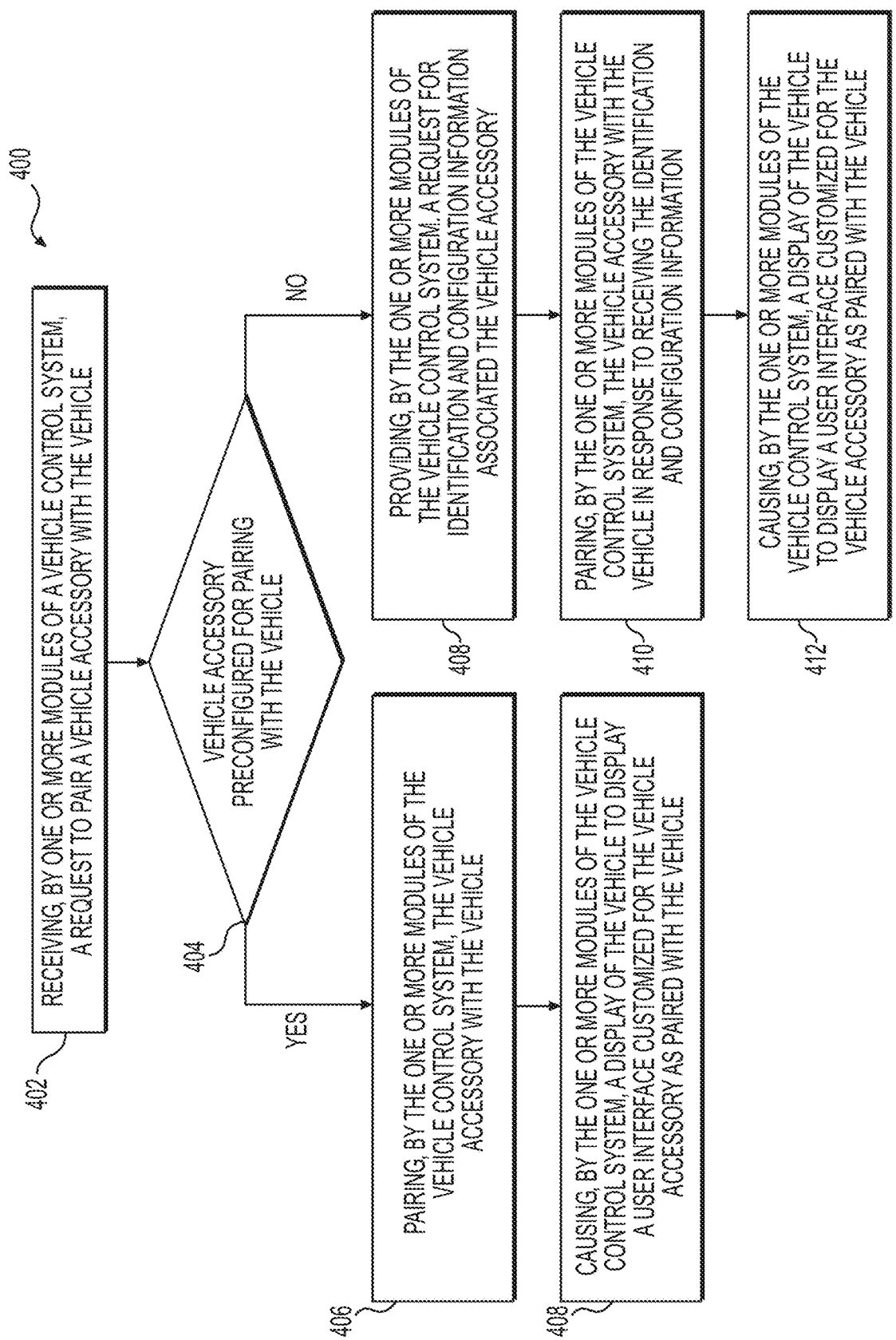
FIG. 4 illustrates a flow diagram of a method for providing an in-vehicle control system including a vehicle accessory integration framework for pairing and integrating one or more vehicle accessories with a vehicle.

FIG. 4 illustrates a flow diagram 400 of a method for providing an in-vehicle control system including a vehicle accessory integration framework for pairing and integrating one or more vehicle accessories with a vehicle, in accordance with the presently disclosed embodiments. The flow diagram 400 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), or any other processing device(s) that may be suitable for processing various vehicle data and making one or more decisions based thereon), software (e.g., instructions running/executing on one or more processors), firmware (e.g., microcode), or some combination thereof.

The flow diagram 400 may begin at block 402 with one or more processing devices receiving, by one or more modules of the vehicle control system, a request to pair a vehicle accessory with the vehicle. The flow diagram 400 may then continue at decision 404 with one or more processing devices determining, by the one or more modules of the vehicle control system, whether the vehicle accessory is preconfigured for pairing with the vehicle. For example, in some embodiments, the vehicle control system 104 may determine whether the vehicle accessory 106 is preconfigured for pairing with the vehicle 102 by determining, for example, whether the vehicle accessory 106 is an accessory designed and manufactured by the same automotive company or other manufacturer that also designed and manufactured the vehicle 102 on which the vehicle accessory 106 is to be coupled. In other embodiments, the vehicle control system 104 may determine whether the vehicle accessory 106 is preconfigured for pairing with the vehicle 102 by determining, for example, whether the vehicle accessory 106 is preconfigured in accordance with one or more predetermined APIs, networking and messaging protocols, provisioning protocols, and so forth.

In certain embodiments, in response to determining, by the one or more modules of the vehicle control system, that the vehicle accessory is preconfigured for pairing with the vehicle, the flow diagram 400 may then continue at block 406 with one or more processing devices pairing, by the one or more modules of the vehicle control system, the vehicle accessory with the vehicle. For example, in one embodiment, the vehicle control system 104 may pair the vehicle accessory 106 to the vehicle 102 utilizing one or more short-range wireless communication networks (e.g., Bluetooth®, BLE, 6LoWPAN, NFC, or other short-range VAN). The flow diagram 400 may then continue at block 408 with one or more processing devices causing, by the one or more modules of the vehicle control system, a display of the vehicle to display a user interface customized for the vehicle accessory as paired with the vehicle. For example, in some embodiments, the vehicle control system 104 may display to the driver of the vehicle 102, for example, a user interface customized to the type and functionality of the vehicle accessory 106 for the user to view, update, or adjust one or more settings associated with the vehicle accessory 106, control a functionality of the vehicle accessory 106, or to verify the physical, electrical, or communicative installation of the vehicle accessory 106.

On the other hand, in response to determining, by the one or more modules of the vehicle control system, that the vehicle accessory is not preconfigured for pairing with the vehicle at decision 404, the flow diagram 400 may then continue at block 408 with one or more processing devices providing, by the one or more modules of the vehicle control system, a request for identification and configuration information associated with the vehicle accessory. For example, in certain embodiments, the vehicle control system 104 may provide a request to the vehicle accessory 106 for identification and configuration information including, for example, one or more of authorization information, authentication information, UID, a device type for the vehicle accessory 106, a provisioning protocol for the vehicle accessory 106, an approval certification for the vehicle accessory 106, one or more networking or messaging protocols, one or more APIs, and so forth.

In certain embodiments, upon receiving the requested identification and configuration information, the flow diagram 400 may then continue at block 410 with one or more processing devices pairing, by the one or more modules of the vehicle control system, the vehicle accessory with the vehicle. For example, as noted above, the vehicle control system 104 may pair the vehicle accessory 106 to the vehicle 102 utilizing one or more short-range wireless communication networks (e.g., Bluetooth®, BLE, 6LoWPAN, NFC, or other short-range VAN). The flow diagram 400 may then conclude at block 412 with one or more processing devices causing, by the one or more modules of the vehicle control system, a display of the vehicle to display a user interface customized for the vehicle accessory as paired with the vehicle. For example, as discussed above, the vehicle control system 104 may display to the driver of the vehicle 102, for example, a user interface customized to the type and functionality of the vehicle accessory 106 for the user to view, update, or adjust one or more settings associated with the vehicle accessory 106, control a functionality of the vehicle accessory 106, or to verify the physical, electrical, or communicative installation of the vehicle accessory 106.

Figure 5:
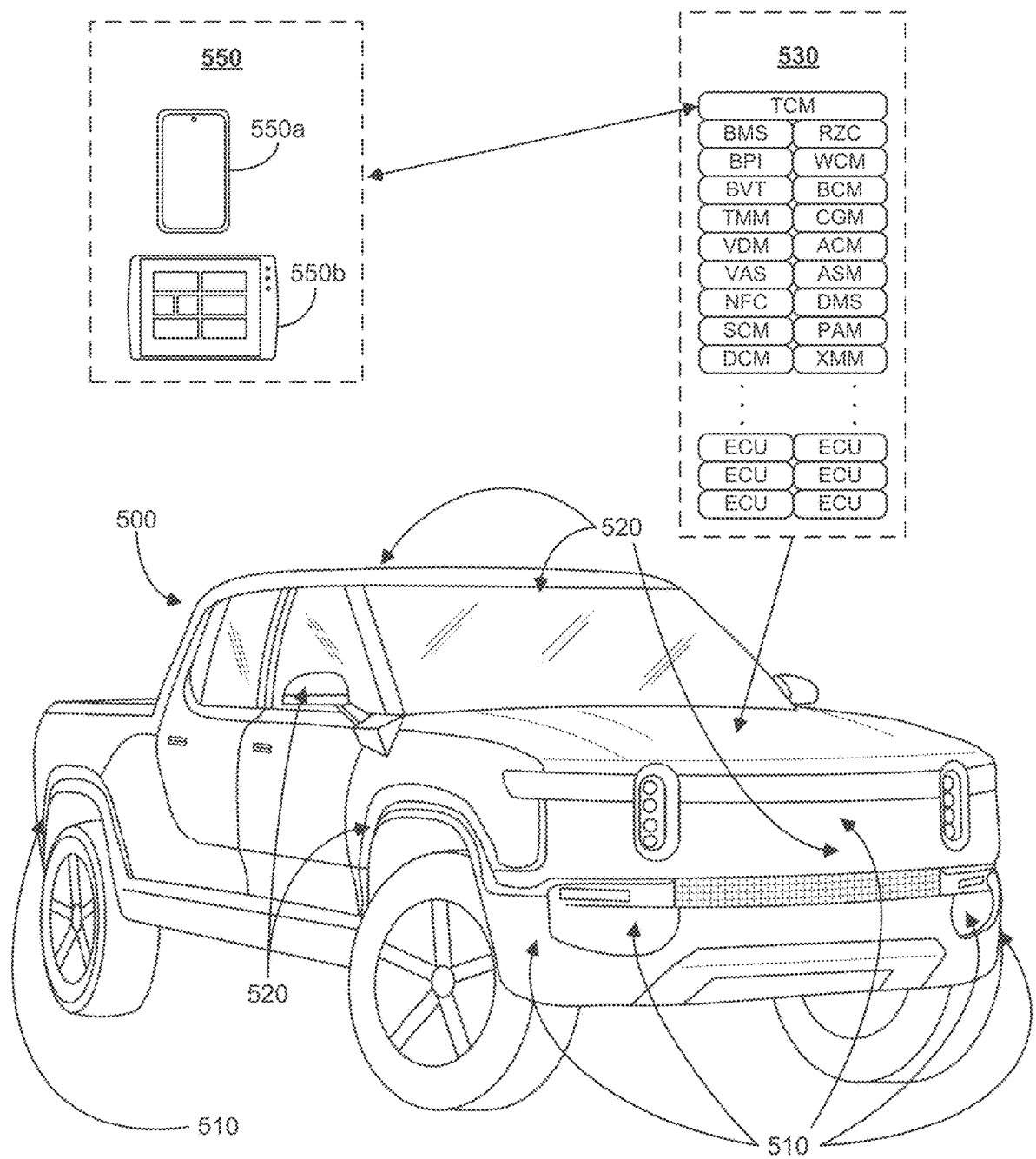
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enables control of various systems on-board the vehicle. As shown in FIG. #, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMA4 may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530. In some embodiments, functions of the ACM and the XMM may be combined together into an Autonomous eXperience Module (AXM) ECU.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, and/or a Body Control Module (BCM) ECU.

Figures 6A, 6B:
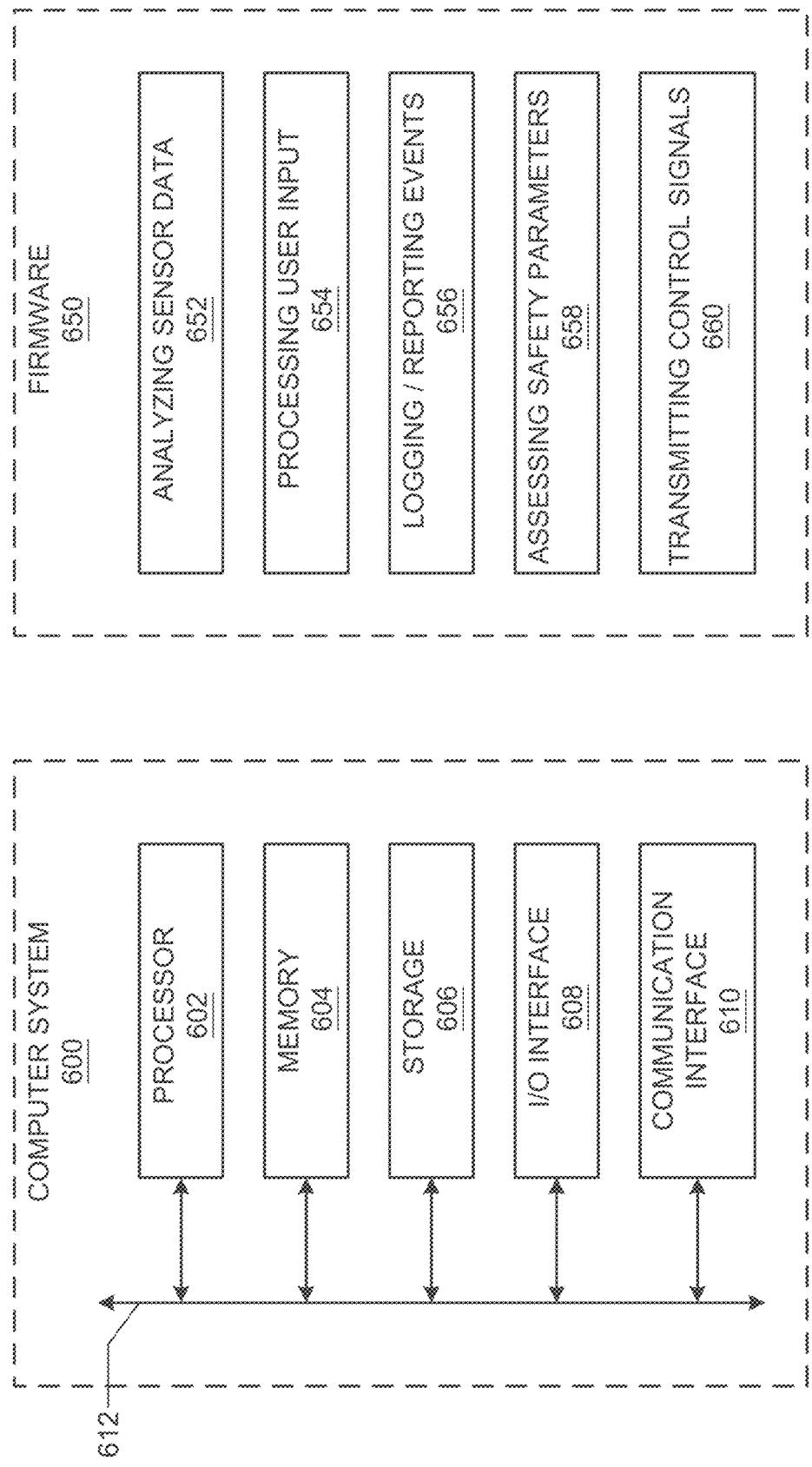
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units 622 and 632) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units 624 and 634). Processor 602 may include one or more internal caches for data, instructions, or addresses.

In certain embodiments, memory 604 includes main memory for storing instructions for processor 602 to execute or data for processor 602 to operate on. In certain embodiments, one or more memory management units (MMUs) reside between processor 602 and memory 604 and facilitate accesses to memory 604 requested by processor 602. In certain embodiments, memory 604 includes random access memory (RAM). This disclosure contemplates any suitable RAM.

In certain embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In certain embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In certain embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In certain embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A control system for a vehicle, comprising:
one or more non-transitory computer-readable storage media including instructions; and
one or more processor coupled to the one or more non-transitory computer-readable storage media, the one or more processors configured to execute the instructions to:
receive, by one or more modules of the control system, a request to pair an accessory with the vehicle;
determine, by the one or more modules of the control system, that the accessory is preconfigured for communication between the accessory and a user interface of the vehicle based on the accessory being automatically preauthorized to exchange information with the vehicle;
in response to determining that the accessory is preconfigured for communication with the vehicle:
pair, by the one or more modules of the control system, the accessory with the vehicle; and
cause, by the one or more modules of the control system, a display associated with the vehicle to display the user interface customized for the accessory as paired with the vehicle.

2. The control system of claim 1, wherein the instructions further comprise instructions to:
in response to determining that the accessory is not preconfigured for communication with the vehicle:
provide, by the one or more modules of the control system, a request for identification and configuration information associated with the accessory;
pair, by the one or more modules of the control system, the accessory with the vehicle in response to receiving the identification and configuration information; and
cause, by the one or more modules of the control system, the display associated with the vehicle to display the user interface customized for the accessory as paired with the vehicle based on the received identification and configuration information.

3. The control system of claim 2, wherein the identification and configuration information comprises one or more of authorization information, authentication information, a unique identifier (UID), a device type for the accessory, a provisioning protocol for the accessory, an approval certification for the accessory, one or more networking protocols, one or more application programming interfaces (APIs), or a combination thereof.

4. The control system of claim 2, wherein the instructions to pair the accessory with the vehicle in response to receiving the identification and configuration information comprise instructions to pair the accessory with the vehicle in accordance with a limited-access configuration.

5. The control system of claim 1, wherein the instructions to determine that the accessory is preconfigured for communication with the user interface of the vehicle comprise instructions to determine whether the accessory is a product of a third-party manufacturer.

6. The control system of claim 1, wherein the accessory was developed by a third-party manufacturer utilizing a software development kit (SDK) associated with the vehicle.

7. The control system of claim 1, wherein the accessory was developed by a third-party manufacturer utilizing a software requirements specification (SRS) associated with the vehicle.

8. The control system of claim 1, wherein the instructions to determine that the accessory is preconfigured for communication with the user interface of the vehicle further comprise instructions to determine that the accessory is preconfigured for a plug and play (PnP) pairing with the vehicle.

9. The control system of claim 1, wherein the instructions further comprise instructions to:
subsequent to causing the display of the vehicle to display the user interface customized for the accessory:
receive, via the user interface displayed on the display, one or more user inputs corresponding to a request for the accessory to perform an operation; and
cause, by the one or more modules of the control system, the accessory to perform the operation.

10. The control system of claim 9, wherein the request is for the accessory and one or more components of the vehicle to perform the operation, and wherein the instructions further comprise instructions to cause, by the one or more modules of the control system, the accessory and the one or more components of the vehicle to perform the operation.

11. The control system of claim 1, wherein the instructions further comprise instructions to:
subsequent to causing the display of the vehicle to display the user interface customized for the accessory:
receive, via the user interface displayed on the display, one or more user inputs corresponding to a request to view one or more settings options associated with the accessory; and
cause, by the one or more modules of the control system, the display of the vehicle to display the one or more settings options associated with the accessory.

12. The control system of claim 1, wherein the instructions further comprise instructions to:
receive, by one or more modules of the control system, a request to pair a second accessory with the vehicle;
determine, by the one or more modules of the control system, that the second accessory is preconfigured for communication with the user interface of the vehicle based on one or more software-based instructions provided by a manufacturer of the vehicle to a third-party manufacturer of the second accessory;
in response to determining that the second accessory is preconfigured for communication with the vehicle:
pair, by the one or more modules of the control system, the second accessory with the vehicle; and
cause, by the one or more modules of the control system, the display associated with the vehicle to display the user interface customized for the second accessory as paired with the vehicle.

13. The control system of claim 1, wherein the accessory detachably couples to an external portion of the vehicle.

14. The control system of claim 1, wherein the accessory comprises one or more of a camping accessory, a roof rack accessory, a front rack accessory, a crossbar accessory, a lighting accessory, a sporting equipment mount accessory, a sporting gear shuttle accessory, a towing accessory, a towing capacity gauge accessory, a ladder rack accessory, a lumber rack accessory, a truck bed cover accessory, a truck tool box accessory, a trailer hitch accessory, a horse trailer accessory, a rock guard accessory, a snow plow accessory, a bale mover accessory, a bale loader accessory, or a cargo carrier accessory.

15. A non-transitory computer-readable medium comprising instructions that, when executed by one or more processors of one or more computing devices, cause the one or more processors to:
receive a request to pair an accessory with a vehicle;
determine that the accessory is preconfigured for communication between the accessory and a user interface of the vehicle based on the accessory being automatically preauthorized to exchange information with the vehicle;
in response to determining that the accessory is preconfigured for communication with the vehicle:
pair the accessory with the vehicle; and
cause a display associated with the vehicle to display the user interface customized for the accessory as paired with the vehicle.

16. The non-transitory computer-readable medium of claim 15, wherein the instructions when executed further cause the one or more processors to:
in response to determining that the accessory is not preconfigured for communication with the vehicle:
provide a request for identification and configuration information associated with the accessory;
pair the accessory with the vehicle in response to receiving the identification and configuration information; and
cause the display associated with the vehicle to display the user interface customized for the accessory as paired with the vehicle based on the received identification and configuration information.

17. The non-transitory computer-readable medium of claim 15, wherein the instructions to determine that the accessory is preconfigured for communication with the vehicle comprise instructions that further cause the one or more processors to determine that the accessory is a product of a third-party manufacturer.

18. A method, comprising:
receiving, by one or more modules of a control system for a vehicle, a request to pair an accessory with the vehicle;
determining, by the one or more modules of the control system, that the accessory is preconfigured for communication between the accessory and a user interface of the vehicle based on the accessory being automatically preauthorized to exchange information with the vehicle; and
in response to determining that the accessory is preconfigured for communication with the vehicle:
pair, by the one or more modules of the control system, the accessory with the vehicle, and
cause, by the one or more modules of the control system, a display associated with the vehicle to display the user interface customized for the accessory as paired with the vehicle.

19. The method of claim 18, further comprising:
in response to determining that the accessory is not preconfigured for communication with the vehicle:
providing, by the one or more modules of the control system, a request for identification and configuration information associated with the accessory;
pairing, by the one or more modules of the control system, the accessory with the vehicle in response to receiving the identification and configuration information; and
causing, by the one or more modules of the control system, the display associated with the vehicle to display the user interface customized for the accessory as paired with the vehicle based on the received identification and configuration information.

20. The method of claim 18, wherein determining that the accessory is preconfigured for communication with the vehicle comprises determining that the accessory is a product of a third-party manufacturer.

* * * * *